United States Patent [19]
Gray

[11] Patent Number: 6,155,073
[45] Date of Patent: Dec. 5, 2000

[54] HEAT TRANSFER MATERIALS

[75] Inventor: Peter Geoffrey Gray, Reading, United Kingdom

[73] Assignee: Johnson Matthey Public Limited Company, London, United Kingdom

[21] Appl. No.: 09/230,562

[22] PCT Filed: Jun. 24, 1997

[86] PCT No.: PCT/GB97/01709

§ 371 Date: Jan. 29, 1999

§ 102(e) Date: Jan. 29, 1999

[87] PCT Pub. No.: WO97/49958

PCT Pub. Date: Dec. 31, 1997

[30] Foreign Application Priority Data

Jun. 24, 1996 [GB] United Kingdom ................... 9613211

[51] Int. Cl.$^7$ ........................................... F25B 17/08
[52] U.S. Cl. ............................................ 62/480; 62/481
[58] Field of Search ....................... 62/480, 481

[56] References Cited

U.S. PATENT DOCUMENTS

| | | | |
|---|---|---|---|
| 4,199,959 | 4/1980 | Wurm | 62/480 |
| 4,581,049 | 4/1986 | Januschkowetz | |
| 4,694,659 | 9/1987 | Shelton | 62/480 X |
| 4,765,395 | 8/1988 | Paeye et al. | 62/480 X |
| 5,054,544 | 10/1991 | Maier-Laxhuber et al. | |
| 5,260,243 | 11/1993 | Dunne et al. | 502/68 |
| 5,289,690 | 3/1994 | Rockenfeller et al. | 62/480 X |
| 5,325,916 | 7/1994 | Dunne et al. | 165/104.12 |
| 5,335,519 | 8/1994 | Bernier | 62/481 |
| 5,456,093 | 10/1995 | Dunne et al. | 62/480 |

FOREIGN PATENT DOCUMENTS

| | | |
|---|---|---|
| 0 485 179 A2 | 5/1992 | European Pat. Off. |
| 0 608 539 A1 | 8/1994 | European Pat. Off. |
| 2 665 516 | 2/1992 | France |
| 2 718 683 | 10/1995 | France |
| 08126841 | 5/1996 | Japan |

*Primary Examiner*—Denise L. Ferensic
*Assistant Examiner*—Chen-Wen Jiang
*Attorney, Agent, or Firm*—Ratner & Prestia

[57] ABSTRACT

In a heat pump, e.g. comprising two adsorbers (1, 2), the adsorbers are monoliths having a multiplicity of open cells capable of flow-through of gas or vapor, and having a coating of an adsorbent, e.g. zeolite, for a fluid such as water vapor. Waste heat, e.g. from a vehicle engine, is supplied to heater (3), which heats up a heat transfer fluid pumped around the system by a reversible pump (11). Heat is lost to the ambient air by a cooler (4), and air from ambient, or recirculated air, is cooled by passing over an evaporator (6) for adsorbate fluid such as water, before entering a vehicle passenger compartment.

12 Claims, 5 Drawing Sheets

HEAT TRANSFER MATERIALS

This application is the U.S. national-phase application of PCT International Application No. PCT/GB97/01709.

This invention concerns improvements in heat transfer materials, and more especially concerns materials and systems suitable for adsorption heat pumps, particularly but not exclusively for refrigeration.

A single adsorber heat pump system utilises a dried (activated) adsorbent material eg zeolite, in an adsorber vessel, which is separated by a valve from an evaporator. All air in the system is evacuated, so that the only gas present is water vapour. If the valve is opened, the adsorption process begins; and the zeolite adsorbs the water. Simultaneously, water in the evaporator vessel evaporates and picks up heat from ambient. In a desorption phase (regeneration), the water in the zeolite is expelled by taking up heat; by removing heat at the condenser, the water vapour is cooled down and condensed to liquid water to be ultimately returned to the evaporator. A single bed system will obviously run in an intermittent fashion, with cooling achieved only during the adsorption phase. For a continuous cooling system, two or more adsorbers are used, as described in more detail below.

BACKGROUND OF THE INVENTION

The use of solid sorption systems in refrigeration is not new, and was first used commercially in the USA in the 1920's. using silica gel and sulphur dioxide. However, the development of CFCs, and the availability of electricity meant that solid sorption refrigeration was abandoned in favour of the vapour compression cycle. Solid sorption systems are generating renewed interest once more, however, as CFCs (and alternatives) are causing increasing environmental concern. The phasing out of CFCs as refrigerants was scheduled for the year 2000 by the Montreal Protocol (1987); Germany requires phase-out by 1995, and the EC by 1997. Other heat transfer media for the vapour compression cycle such as ammonia, hydrocarbons, $CO_2$ etc have advantages in some circumstances but are not viewed as true alternatives. Adsorption heat pumps are being viewed positively in the fields of heating and air conditioning, and it seems possible that a first commercial use in this current period would be in automotive air conditioning and/or in a residential or commercial space heating and/or cooling market.

For example U.S. Pat. No. 5,325,916 (UOP), discloses a zeolite-coated aluminium heat exchanger tube, and U.S. Pat. No. 4,581,049 (Schiedel) and U.S. Pat. No. 5,054,544 (Zeotech) are similar. here remains a need for improved solid adsorber materials, and for improved systems.

U.S. Pat. No. 4,199,959 (Institute of Gas Technology) teaches an air conditioning apparatus which does not require any heat transfer fluid. Adsorbers for this apparatus are disclosed comprising aluminium honeycombs bonded to aluminium sheet. To the extent that the teaching of this document can be understood, the physical form of the adsorbers differs from that taught in the present invention in that it appears that the coating is applied to honeycomb structures whose axis is perpendicular to the gas flow. The invention is stated to be principally for low capacity air conditioning, using solar heat for example, that may be used in domestic buildings. We do not believe that this system could readily be adapted for use on board a vehicle.

The present invention provides an improved heat pump adsorber unit, comprising a heat transfer monolith having a plurality of elongated open cells capable of through-flow of gas or vapour, said cells being coated internally with an adsorbent for a refrigerant fluid, and one or more walls defining a passage for a heat exchange fluid, external to said monolith and separated therefrom, the monolith having an effective thermal conductivity from its geometric centre to said passage of at least 5 W/mK.

BRIEF SUMMARY OF THE INVENTION

A heat pump system incorporating the novel adsorber preferably operates using waste heat, eg from an internal combustion engine, or waste heat from a fuel cell system, but can utilise other low grade heat sources including heat from sunlight. Higher grade heat, eg from combustion of gas, may, of course, be used. For commercial or industrial applications, waste heat such as from process streams, may be used. It is well known that a heat pump system is an energy-efficient method of providing cooling or heating.

Suitable metal monoliths may be made using technology originally developed for manufacturing metal monolithic supports for exhaust gas catalysts, wherein a metal sheet having a metal corrugated sheet bonded thereto, is wound to form a spiral body. Other monoliths may be manufactured by extrusion of a suitable material to form honeycomb blocks with elongated open cells. Such blocks may be fired to increase stability under operating conditions. In the case of metal monoliths, because the adsorbers operate under very much less stringent conditions than exhaust gas catalysts, the choice of metals is usefully broadened to include those of much higher thermal conductivity than the stainless steel which is commonly used for catalytic convertors, especially Al or Cu. Preferably, the monolith is formed in such a way that its thermal conductivity is maximised. Suitably, therefore, metal-loaded compositions are used to fill any gaps caused by normal manufacturing procedures. In general, sintered metal materials do not exhibit adequate thermal conductivity.

The deposition of adsorbent upon the monolith may be carried out by an adaptation of the technology used to coat monoliths for exhaust gas catalysts with alumina or alumina/ceria. If desired, a preliminary or base coating of, for example, a high surface area alumina or other metal oxide may be applied to the monolith, conveniently using a binder such as "Dispural", which is a collodal alumina, and the coated monolith baked or fired to form an adherent base coat. The adsorbent itself, for example a molecular sieve such as a zeolite, may then be applied as an aqueous slurry typically containing 40 to 50% of zeolite, and using a binder such as "Ludox", which is a colloidal silica, by dipping the monolith into a bath of slurry, or by drenching the monolith using a shower of slurry. If required to build up particular thicknesses of zeolite, a first coating may be dried and/or baked, and second and possibly further coatings applied in the same way. Suitable loadings of adsorbent may be expressed typically as approximately 400–600 g per liter of total monolith volume.

DETAILED DESCRIPTION OF THE INVENTION

Figure 1:
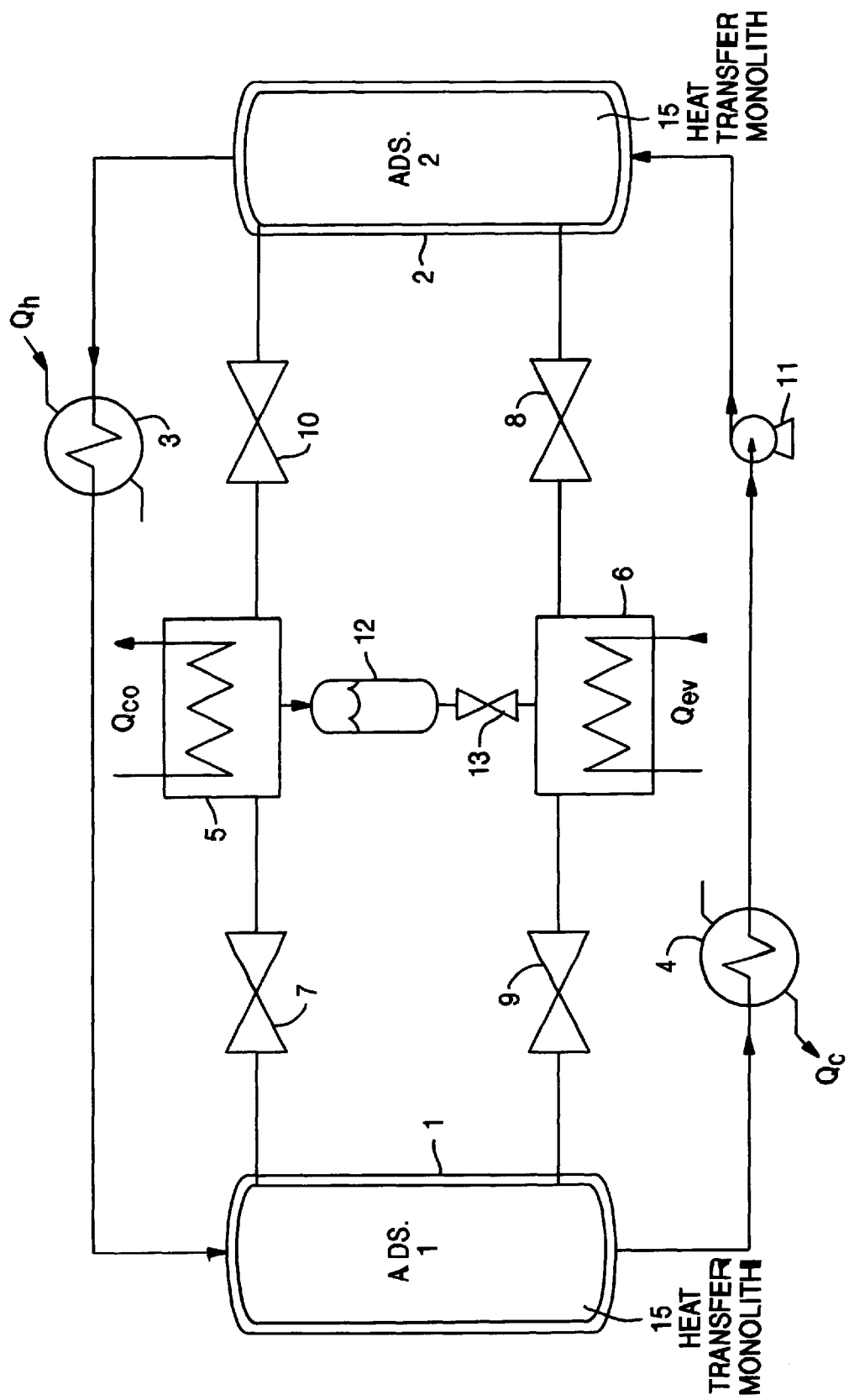
FIG. 1 is a schematic view of a two-adsorber system.

The system of the invention is more particularly described with reference to FIG. 1 of the accompanying schematic drawing, which shows a two-adsorber system, and this will be used to explain the present invention.

With reference to the drawing, it is useful to define certain terms; the cooling coefficient of performance, "COP", and the specific cooling power, "SCP", are defined as follows:

$$COP = \frac{Q_{ev}}{Q_h} = \frac{\Delta m L_v}{Q_h}$$

$$SCP = \frac{Q_{ev}}{M_{ads} t_c}$$

where $\Delta m$ is the mass of adsorbate fluid evaporated from the evaporator during a cycle of operation, $L_v$ is the latent heat of vaporisation, $Q_h$ is the heat input to the heater, $M_{ads}$ is the mass of adsorbent, and $t_c$ is the time of a complete cycle.

Energy consumption by pumps or valve operation is neglected.

Referring to FIG. 1, a two-adsorber thermal wave recuperative adsorption cycle heat pump is shown. In this case, the adsorbent is NaX zeolite and the adsorbate is water vapour. The entire system is evacuated of air and the only gas present is water vapour. Initially, all valves (7–10, 13) are closed.

Initially adsorber 1 is assumed to be cool and saturated with water vapour, while adsorber 2 is hot and free of water vapour. In the first half-cycle the heat transfer fluid (HTF) is pumped by a small reversible pump (11) in the direction shown by the arrows. Hot fluid (typically 250° C.) contacts adsorber 1 and raises its temperature, the fluid itself being partially cooled (this is the recuperative part of the cycle). At an appropriate temperature (selected according to the condenser pressure) valve 7 is opened and water vapour leaves the adsorber and enters the condenser 5 (cooled by ambient air). In the condenser. water condenses and loses heat $Q_{co}$ to the external environment (ambient air). The partially cooled HTF (exiting the heating/cooling jacket of adsorber 1) then passes into the cooler (4) where ambient air provides further cooling (to, typically, 40° C.). The water which condenses in condenser 5 is collected in a receiver, 12.

The cold HTF then circulates over adsorber 2 (initially hot and free of water vapour), and when an appropriate temperature (selected according to the evaporator pressure) is reached valve 8 is opened. Liquid water is allowed to evaporate and the vapour adsorbs onto the zeolite in adsorber 2. The evaporator 6 cools, by virtue of the latent heat of evaporation, and consequent removal of heat $Q_{ev}$ is used to provide the cooling of the ambient air, or process cold stream. Upon passing over adsorber 2, the initially cool HTF is partially heated (recuperation), it then flows through the heater 3 to attain its maximum temperature. The hot fluid then flows on to contact adsorber 1, as described above.

After a predetermined time (usually when adsorber 2 is fully saturated and adsorber I is fully regenerated), the half-cycle time, valves 7 and 8 are closed and the heat transfer fluid circulated in the reverse direction. The quantity of water condensed and collected in the receiver during the first-half cycle is then returned to the evaporator by opening valve 13. The second half-cycle then continues as per the first half-cycle, but with the functions of adsorbers 1 and 2 swapped.

The "pumping" of vapour between the evaporator and condenser (or vapour recompression) is thus performed by the adsorption/desorption processes occurring within the adsorbers; i.e., this is what replaces the mechanical compressor in a conventional CFC system. The driving force for this process is generally energy in the form of waste heat although other sources such as gas combustion or solos energy may be used. In contrast, in a conventional system, the energy must be supplied as mechanical work from an engine, or electricity in the case of an electrically driven domestic/commercial system.

Summary of heat loads in the system as applied to a motor car: $Q_{co}$ and $Q_c$ are provided by ambient air, $Q_h$ is provided by waste heat from the engine, and $Q_{ev}$ is the cooling load required by the air entering the passenger compartment.

The heat transfer fluid is passed over and/or through each adsorber, but each adsorber is isolated from the heat transfer fluid, so that there is only heat transfer between the fluid and the adsorber. Thus, for example, each adsorber may be provided with a jacket which contains the heat transfer fluid, and generally known procedures and designs to increase heat transfer between the adsorber and the fluid may be used. A commercial heat transfer fluid. eg "Dowtherm"™ may be used.

The principles of the adsorber type heat pump are the same no matter what type of adsorber is used. However, it is believed that the novel monolith-supported adsorbers demonstrate improved performance over either type of adsorber which has previously met practical acceptance, namely the packed bed and the graphite-consolidated bed (as described by Guilleminot et al, Proceedings of the International Adsorption Heat Pump Conference, AES-Vol 31, 401–406 (1994)). Thus, performance as measured by COP and SCP for the packed bed is rather small, for the graphite-consolidated bed is respectively 0.9 and 35 (W/kg adsorbent) and for the novel monolith adsorbent is respectively approximately 1 and approximately 250 (W/kg adsorbent) for a stainless steel monolith, which does not have optimum conductivity. It is believed that the improved performance is primarily due to the good mass and heat transfer properties of the monolith in comparison with the graphite-consolidated bed. Although some heat transfer properties of the graphite-consolidated bed (eg thermal conductivity) may be better than a stainless steel monolith adsorber, wall heat transfer coefficient of the novel adsorber is far superior.

The novel adsorbers of the invention may conveniently be in the form of elongated cylinders. Thus, for all cycle times between 500 seconds and 1700 seconds, a stainless steel adsorber radius (or thickness if there is a central passage for heat transfer fluid) of about 2 cm gives optimum SCP. For such a thickness, the adsorber should be about 0.75 to 1.5 meters long, and this may be accommodated by utilising folding, or more preferably, a number of small adsorbers connected in series.

Figure 2:
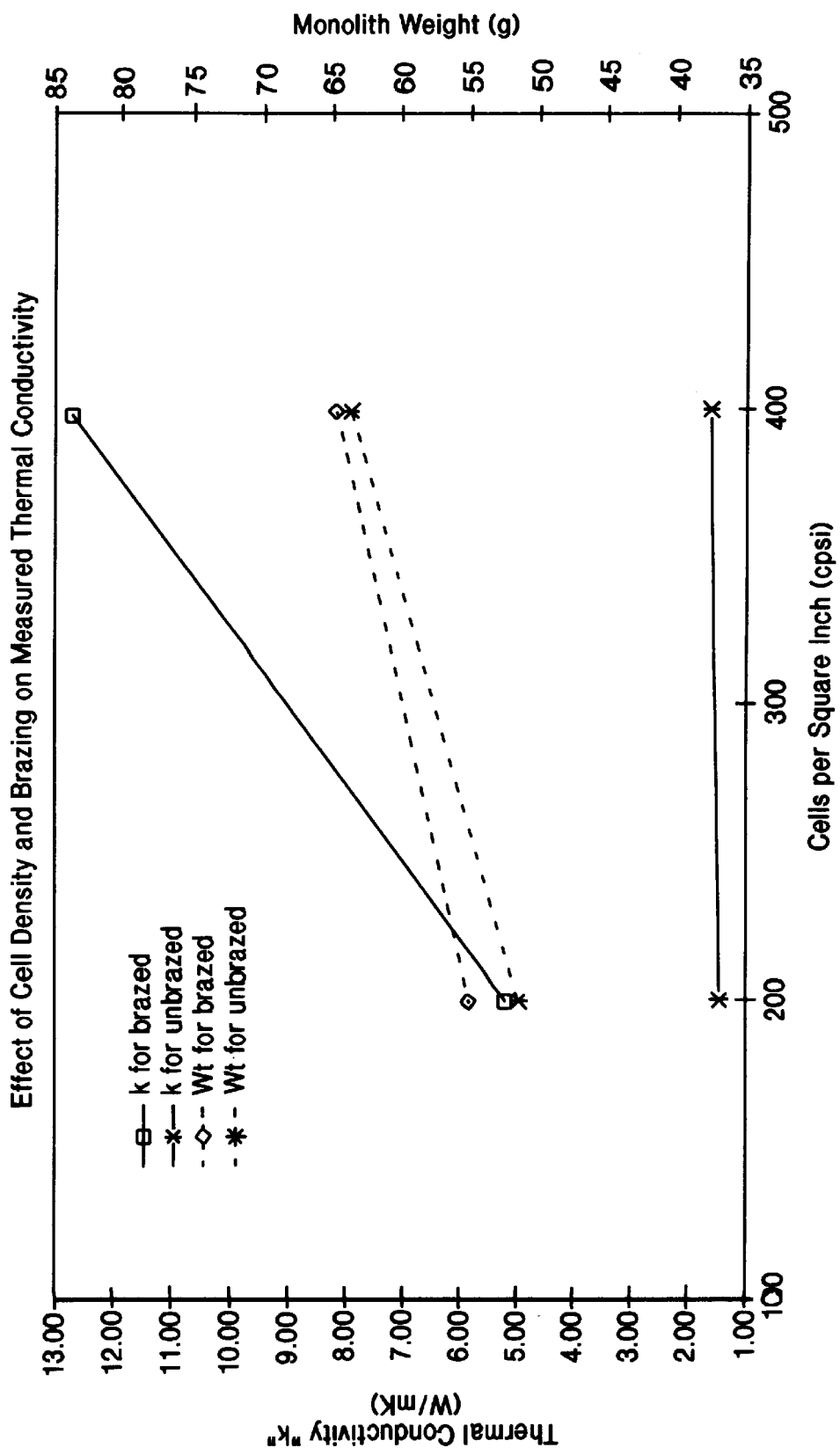
FIG. 2 is a graphical representation of the effect of cell density and razing on measured thermal conductivity.
Figure 3:
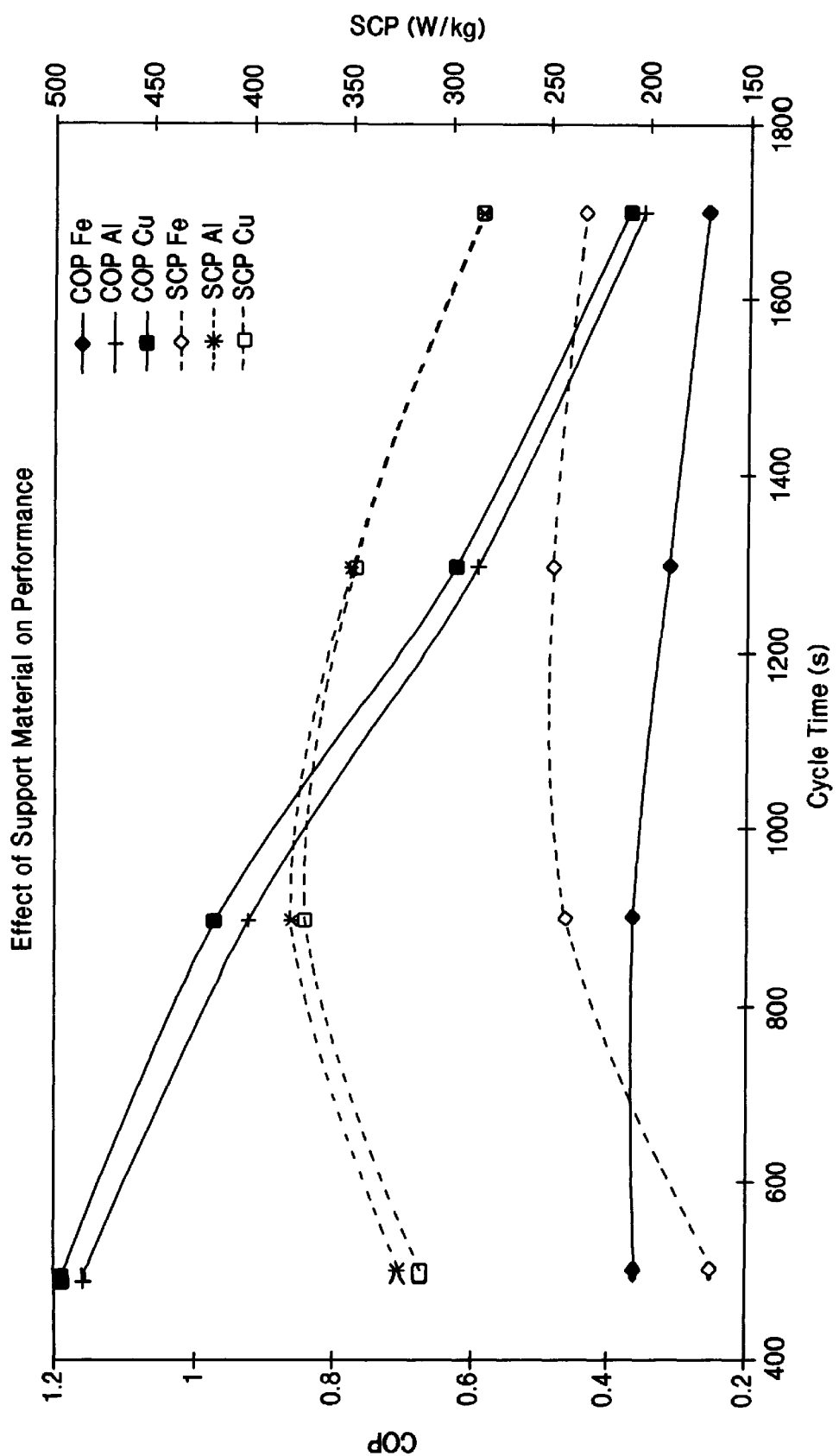
FIG. 3 is a graphical representation of the effect of various support materials on the adsorption heat pump performance.
Figure 4:
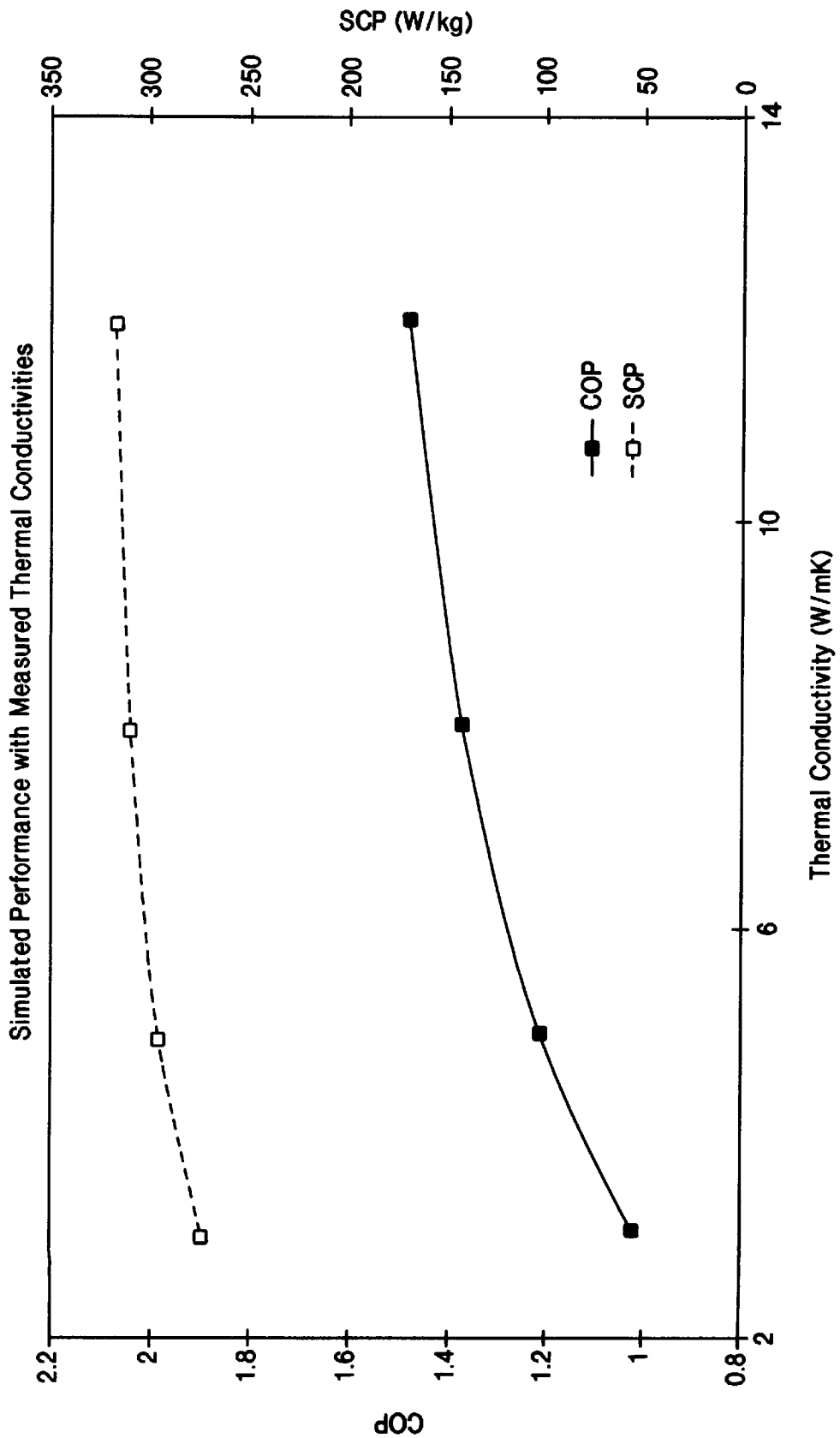
FIG. 4 is a graphical representation of simulated adsorption heat pump performance with measured thermal conductivities.
Figure 5:
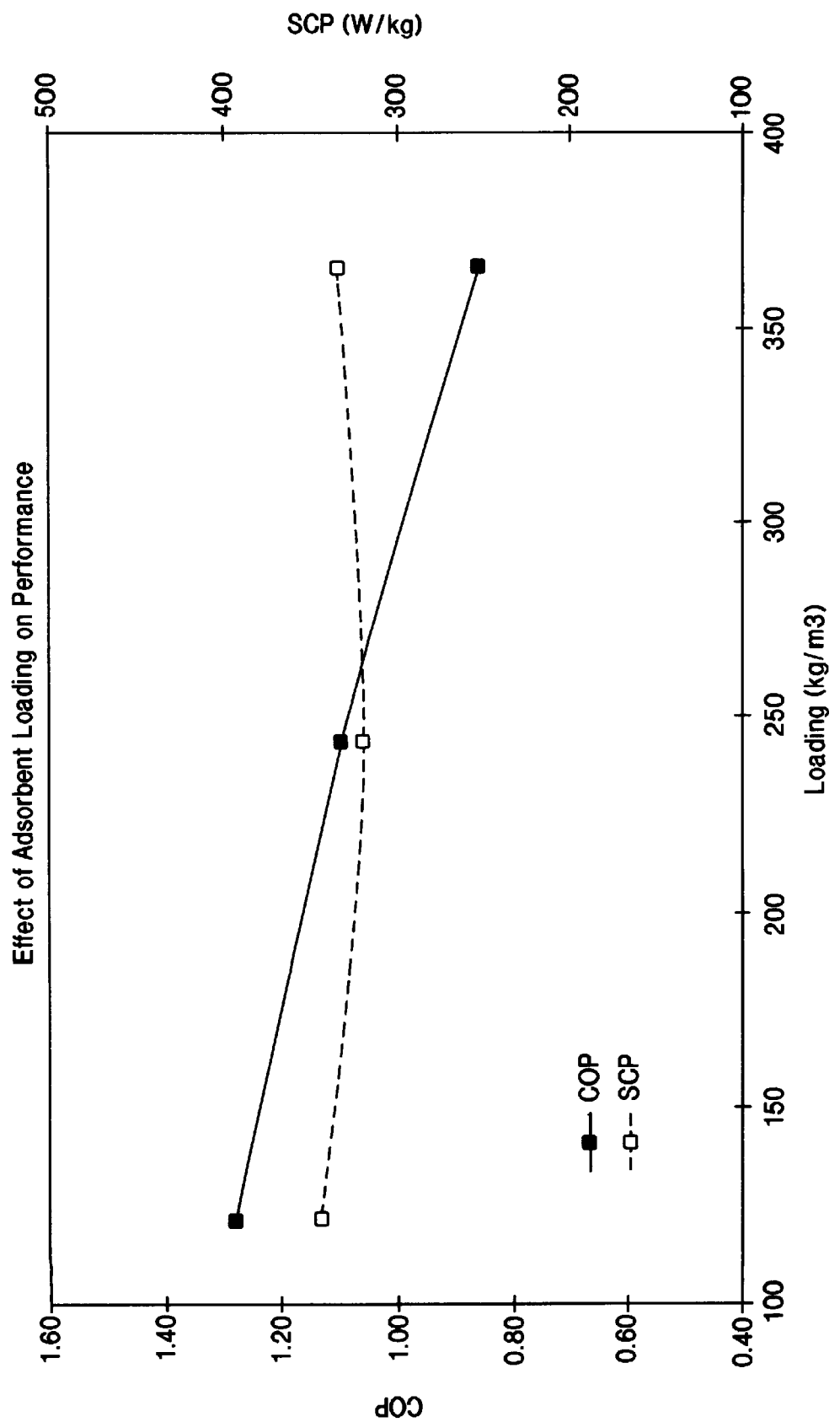
FIG. 5 is a graphical representation of the effect of adsorbent loading on the adsorption heat pump performance.

Further studies and experiment have confirmed the effectiveness of the novel adsorber of the present invention, and reference is made to accompanying FIGS. 2 and 5.

Initial studies confirmed that in cylindrical metal monoliths, increasing cell wall thickness improved the measured effective radial thermal conductivity, by increasing the area, or pathway, for heat conduction.

FIG. 2:

This shows the effect of cell density and brazing on the effective radial thermal conductivity. Increasing the cell density improves the thermal conductivity by reducing the tortuosity (or length) of the heat conduction pathways within the monolith, this is a significant effect as the thermal conductivity more than doubles (see top curve) even though the weight of aluminium in the monolith has only increased by ~15%.

Improving the thermal conductance of the contact points by brazing (or painting) with aluminium powder has the most dramatic effect, indicating that contact resistance between each layer within the monolith has major influence on the overall radial effective thermal conductivity.

The thermal properties of the substrate are very important: monoliths made of Fecralloy (thermal conductivity ten-times lower than aluminium) gave measured effective thermal conductivities of only 0.26 W/mK (unbrazed) and 0.32 W/mK (brazed). Fecralloy is a standard material for manufacturing metal monolith substrates for catalytic convertors.

FIG. 3:

This shows computer simulation results for the adsorption heat pump performance with different substrate materials. As expected the material with very low thermal conductivity (Fecralloy) gives poor performance. Although copper has a much higher thermal conductivity than aluminium, its thermal mass (density multiplied by heat capacity) is also higher these two factors balance each other, resulting in a performance very close to that of aluminium.

FIG. 4:

This shows computer simulation results for the effect of measured effective thermal conductivity on adsorption heat pump performance. As expected, performance improves with increasing thermal conductivity, although (for the given adsorber dimensions) there is no major gain to be made with thermal conductivities above 5 W/mK.

FIG. 5:

This shows computer simulation results for the effect of adsorbent loading on heat pump performance. Although the COP (thermodynamic efficiency) decreases with increasing loading (due to the increased thermal mass), the SCP (specific cooling power) does not degrade significantly. This is important as it means that the total cooling power of the adsorber can be increased almost linearly with the adsorbent loading.

Measurement Technique:

The effective radial thermal conductivities are measured by a constant heat flux technique. For cylindrical monolith samples a thin electrical cartridge heater is located at the central axis of the sample, with two (or more) thermocouples located at different radial positions between the centre and the outer surface of the monolith. When an electric current is applied to the heater the centre axis temperature rises and a temperature gradient (measured by the thermocouples) is developed between the centre and the outer surface of the monolith; this temperature gradient being a function of the effective radial thermal conductivity of the sample. For a known heat flux (given by the electric power consumed by the heating element) the temperature gradient is measured; using these data the thermal conductivity is calculated.

What is claimed is:

1. An improved heat pump adsorber unit, comprising a heat transfer monolith having a plurality of elongated open cells capable of through-flow of gas or vapour, said cells being coated internally with an adsorbent for a refrigerant fluid and one or more walls defining a passage for a heat exchange fluid, external to said monolith and separated therefrom, the monolith having an effective thermal conductivity from its geometric centre to said passage of at least 5 W/mK.

2. An adsorber according to claim 1 wherein the monolith is constructed of one of, aluminum copper or carbon.

3. An adsorber according to claim 2, wherein the adsorbent is a zeolite.

4. An adsorber according to claim 1, wherein the adsorbent is a zeolite or active carbon.

5. An adsorber according to claim 1, having 400 to 600g of adsorbent per liter of monolith volume.

6. An adsorber according to claim 1, wherein the monolith has at least 200 cells per square inch (30 cells/sq cm).

7. A heat pump system utilising a heat exchange fluid and incorporating an adsorber according to claim 1.

8. A heat pump system according to claim 7, wherein the adsorbent coating is a zeolite and the refrigerant fluid is water.

9. A heat pump system according to claim 7, comprising two adsorbers and utilising a heat transfer fluid to supply heat to or remove heat from each adsorber.

10. A heat pump system according to claim 9, constructed and arranged to use waste heat from a vehicle engine as a heat input into the system and to provide cooling to air contained in or supplied to a passenger and/or driver compartment.

11. A motor vehicle comprising a heat pump system according to claim 10.

12. An improved heat pump adsorber unit, comprising a heat transfer monolith having a plurality of elongated open cells capable of through-flow of gas or vapour, said cells 1eing coated internally with an adsorbent for a refrigerant fluid and one or more walls defining a passage for a heat exchange fluid, external to said monolith and separated therefrom, the monolith having at least 200 cells per square inch (30 cells/sq. cm) and an effective thermal conductivity from its geometric centre to said passage of it least 5 W/mK.

* * * * *